Patented Jan. 14, 1930

1,743,214

UNITED STATES PATENT OFFICE

PAUL HEROLD AND HELLMUTH LANGHEINRICH, OF NEUROSSEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF ORGANIC COMPOUNDS CONTAINING OXYGEN

No Drawing. Application filed November 8, 1927, Serial No. 231,986, and in Germany November 15, 1926.

It is already known that carbon monoxid can be reduced to hydrocarbons by means of hydrogen, at ordinary pressure and at an elevated temperature, in the presence of catalysts containing iron, nickel or cobalt, carbon dioxid and water being thereby formed as by-products.

We have now found that organic compounds containing oxygen are also obtained, either alone or in conjunction with hydrocarbons, by reducing oxids of carbon with hydrogen under diminished, ordinary or slightly elevated pressure up to about 20 atmospheres and at an elevated temperature, if the operation be carried out below 300° centigrade, the catalyst employed consisting of iron containing small additions of alkalis or alkaline earths (which we hereinafter refer to collectively as oxids of alkali forming metals) or compounds of the same having an alkaline reaction and being used alone or in conjunction with other substances, carriers or activating substances such for example as copper. The resulting products are partly solid, and partly liquid and gaseous. In contrast to the conditions in the production of hydrocarbons alone, less water and more carbon dioxid are formed, and merely traces of the lower members of the paraffin series of hydrocarbons are produced.

The solid products are yellow to yellowish brown in color and contain, besides white paraffin melting at about 65° centigrade brown, viscous resins containing oxygen. The liquid portions have a yellow green to yellow brown colour and boil at approximately between 40° and 200° centigrade. They, too, contain paraffins. Their specific gravity is 0.74–0.80 and their bromine value about 0.25–0.45. The oxygen is contained in amounts up to about 10 per cent. The water of condensation contains alcohol and, in addition to carbon dioxid, organic acids volatilizable by steam.

The following examples will further illustrate how the said invention may be carried into practical effect but the invention is not limited to the examples.

Example 1

Ferric oxid, obtained by precipitating ferric nitrate with ammonia, and carefully washed and dried at 350° centigrade is impregnated with an aqueous solution of 0.75 per cent of potassium hydroxid, and re-dried. After the catalyst has been reduced with hydrogen at 350° centigrade for 36 hours, a mixture of carbon monoxid and hydrogen, containing 60 per cent of the latter, is passed over it at 200° centigrade. The treatment furnishes yellowish green solid products containing 2.2 per cent of oxygen and melting at from 54° to 57° centigrade; a yellow brown oily product with 17.8 per cent of oxygen and having the density 0.767, and an aqueous solution, with a strongly acid reaction requiring 2 cc. of decinormal NaOH per cubic centimetre for neutralization, and containing volatile organic acids.

Example 2

An aqueous solution containing ferric nitrates and cupric nitrate in the molecular ratio 2:1 is precipitated with dilute caustic soda solution, and the precipitate is washed until it is free from nitrate, but still contains 0.32 per cent of NaOH when dried. The catalyst is reduced with hydrogen for 64 hours at 350° centigrade, and over it is then passed a mixture of carbon monoxid and hydrogen containing about 60 per cent of the latter at 200° centigrade. Products similar to those specified in Example 1 are obtained.

What we claim is:

1. The process for the production of organic compounds containing oxygen, which comprises reducing oxids of carbon with hydrogen at approximately atmospheric pressure and at an elevated temperature lower than 300° C. in the presence of a catalyst comprising iron and small amounts of a compound of the alkali forming metals having an alkaline reaction.

2. In the process of claim 1, the employment of a catalyst also containing copper.

3. The process for the production of organic compounds containing oxygen, which comprises passing a mixture of carbon monoxid and hydrogen, containing about 60 per cent of the latter, at 200° C. over a catalyst prepared from precipitated ferric oxid which has been carefully washed, and dried, and then impregnated with an aqueous solution of 0.75 per cent (of the weight of ferric oxid) of potassium hydroxid, redried and thereupon reduced with hydrogen at 350° C.

In testimony whereof we have hereunto set our hands.

PAUL HEROLD.
HELLMUTH LANGHEINRICH.